INVENTORS
Laszlo J. Balint
Stanley D. Lazarus
William N. Russell 3,689,461
PROCESS FOR THE PREPARATION OF LINEAR
CONDENSATION POLYESTERS
Laszlo J. Balint, Chester, Stanley D. Lazarus, Petersburg, and William N. Russell, Colonial Heights, Va., assignors to Allied Chemical Corporation, New York, N.Y.
Continuation-in-part of application Ser. No. 812,350, Apr. 1, 1969. This application Sept. 18, 1969, Ser. No. 859,102
Int. Cl. C07c 69/82
U.S. Cl. 260—75 M  8 Claims

ABSTRACT OF THE DISCLOSURE

A high molecular weight linear condensation polyester is prepared from a polycarboxylic acid and a polyol by (a) esterifying said polycarboxylic acid with said polyol by subjecting to conditions of direct esterification a flowable, uniform dispersion comprised of (1) a paste of the said polycarboxylic acid and the said polyol, and (2) at least 3 parts by weight per part paste of a partially esterified product of said polycarboxylic acid with said polyol, and thence (b) further esterifying and polycondensing the esterification product of step (a) until there is obtained an improved polyester of the desired molecular weight.

CROSS REFERENCE TO RELATED APPLICATION

This application is a continuation-in-part of U.S. application Ser. No. 812,350, filed Apr. 1, 1969, now abandoned.

BACKGROUND OF THE INVENTION

This invention relates to an improved process for preparing linear condensation polyesters. More particularly, it relates to an improved process for preparing high molecular weight and high quality linear condensation polyesters or copolyesters suitable for processing into fibers, filament, films and other shaped articles as a continuous or discontinuous process.

Linear condensation polyester is prepared by a two-stage process, namely, the first stage of preparing monomeric bis-glycol ester of polycarboxylic acid or its oligomer, and the second stage of subjecting the product to further polycondensation. Linear polyethylene terephthalate is presently produced on a commercial scale by the ester interchange reaction between dimethyl terephthalate and ethylene glycol. A direct esterification method has also been known since first disclosed by Whinfield and Dickson in 1941 and illustrated in U.S. Patent 2,465,310; however, such process was viewed with essentially academic interest for many years as it presented no alternatives sufficiently important to be considered on a commercial scale. The process was unreasonably slow and produced a product of such inferior quality as to be substantially unusable. One of the reasons for the inferior quality was the presence of ether groups within the polymer chain which gave poor results when such polymers were subsequently processed into fibers and films. For example, when a glycol condensate such as diethylene glycol is introduced into the main chain of the polyester, the resultant polyester has its softening point lowered, and its properties such as heat resistance, light resistance and oxidation resistance are all degraded. The degradation of such properties becomes still more distinct when the polyester is shaped into, for example, fiber, filament or film which will exhibit poor ultraviolet light stability, poor hydrolytic stability, poor hot-wet ("wash-and-wear") properties, and accelerated dye fading.

Other U.S. patents, such as 3,024,220, 3,050,533 and 3,050,548 illustrate various other process improvements of the direct esterification route in preparing linear polyesters. Although many improvements have been made in the direct esterification route for preparing linear polyesters to the extent that some commercial use is made of this process, many problems still exist such as the necessity of using high glycol to acid ratios and/or the use of expensive agitated multiple reactor systems. The use of such high glycol-acid ratios and multiple reactor systems adds substantially to its preparation cost and can yield a poor quality product. Moreover, the greater the number of reactors in a given multiple reactor system the longer the residence time of the polymer in a finisher with concomitant greater thermal degradation thereof, and the greater the chance of variations in the reaction conditions such as temperature and pressure, all of which lead to inadmissible variations of the average degree of polycondensation and thereby impair the qualities of the shaped articles formed from the melt.

The art is also beset with the problem of how to best enhance the dissolution of the terephthalic acid in the esterification reaction mass, per se, since it is known that the rate of the esterification reaction and consequently of the polycondensation is directly proportional to the rate of dissolution of the terephthalic acid. It is also known, however, that the particle size of the terephthalic acid affects its rate of dissolution, and, accordingly, steps have heretofore been taken to control the rate of the esterification reaction and consequently of the polycondensation by employing terephthalic acid of given particle sizes only. Nevertheless, it will of course be appreciated that particle size thus becomes a critical parameter in the aforementioned direct esterification and indirectly in the polycondensation.

Other problems plaguing the art comprise (1) the difficulty in obtaining via the direct esterification route a polyester having an intrinsic viscosity of 1.0 and greater by means of a continuous melt polymerization, and (2) the difficulties arising out of an abundance of oligomers in the distilled vapor overheads of the various reaction vessels.

It has also been observed in using a paste mixture of terephthalic acid and ethylene glycol that the paste tends to harden and plug the equipment or the ingredients separate out in the critical temperature range thus creating process problems totally alien to the older ester interchange route basically used heretofore, as well as to other direct esterification processes.

SUMMARY OF THE INVENTION

Therefore, it is a prime object of this invention to provide an improved process for the preparation of high molecular weight and high quality fiber, filament and film forming polyesters or copolyesters directly from polycarboxylic acids and polyols, and either as a continuous or discontinuous process.

Another object is to provide a more economical process than heretofore and one which is capable of being operated continuously over an indefinite period of time.

Yet another object of this invention is to provide an improved process wherein the particle size of the reactant polycarboxylic acid is not a significant parameter.

Still another object is to provide an improved process which is capable of affording a polyester having an intrinsic viscosity of 1.0 or more by a continuous melt polymerization, and one which is not characterized by an abundance of oligomers in reactor overheads.

Still another object is to provide an improved process which is substantially insensitive to short term fluctuations in the polyol/polycarboxylic acid mol ratio.

Still another object is to provide an improved process wherein the formation of objectionable ethers such a diethylene glycol is inhibited during the esterification first stage, even in the absence of added ether inhibitors.

Still another object is to provide an improved process which is less susceptible to the admission of variations of the average degree of polycondensation, and one which requires less residence time in a finisher with concomitant less thermal degradation of polymer.

Still another object is to provide an improved process capable of affording higher quality polyesters which display intrinsic viscosities after a given degree of finishing which are correspondingly higher than those obtainable after the same degree of finishing in the absence of the features of this invention.

In attaining the objects of this invention, one feature resides in the direct esterification of a flowable uniform dispersion comprised of a paste of a polycarboxylic acid and a polyol with which has been admixed 3 parts or more by weight (per one part paste) of a partially esterified or prepolymerized product (having a degree of conversion of between about 30 and 85%, and even higher) of like reactants. The product of this direct esterification is then further esterified and polycondensed to obtain an improved polyester of desired quality and molecular weight.

Another feature of this invention resides in employing a continuously recirculating mixture of the partially esterified or prepolymerized product, whereby the esterification and the further esterification and polycondensation are permitted to proceed on a continuous basis.

Other objects, features and advantages of this invention will become more apparent from the following description when taken in conjunction with the accompanying figures of drawing.

DETAILED DESCRIPTION OF THE INVENTION

Figure 1:
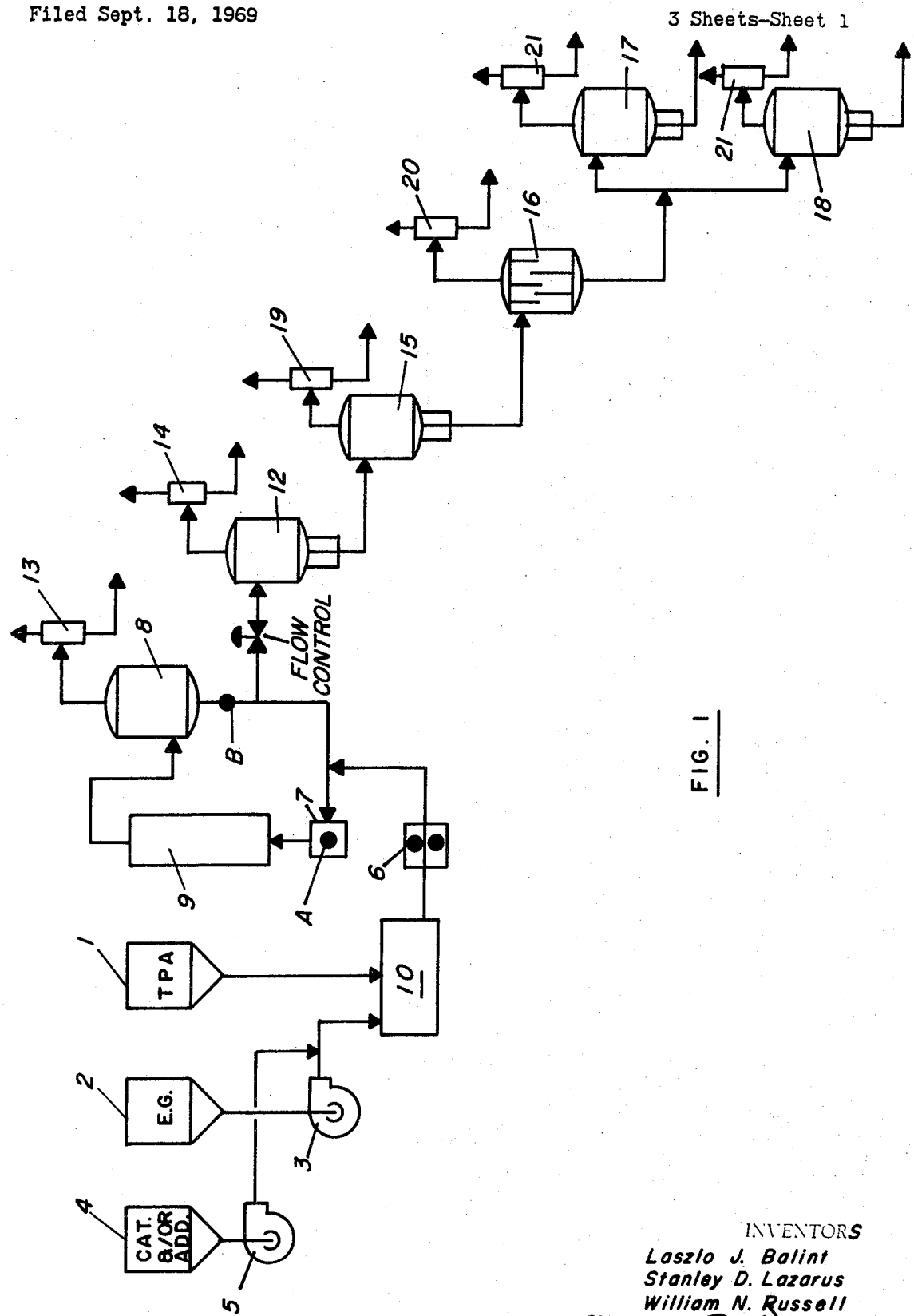
FIG. 1 is a diagrammatical drawing of apparatus useful in carrying out the method of this invention.

In FIG. 1 of the drawing, terephthalic acid stored in the tank 1 is continuously fed to the mixer 10 via a conveyor (not shown). Also continuously fed to the mixer 10 are ethylene glycol stored in the tank 2 by means of the pump 3, and, optionally advantageously, catalyst (esterification and/or polycondensation) and/or additive stored in the tank 4, this latter by means of the pump 5. In the mixer 10 agitation is performed whereby the terephthalic acid, ethylene glycol and, optionally advantageously, the catalyst and/or additive are converted to a paste. The paste is then pumped from the mixer 10 by a feed pump 6 to the inlet of the circulating pump 7. The paste mixture is next combined with recirculating or recycle partially esterified product from the reactor-separator 8 and pumped therewith by the circulating pump 7 through the esterification reactor or heater 9, for example, a multiple tube heat exchanger. Effluent of the heater 9 passes overhead to the reactor-separator 8 for vapor-liquid separation and further reaction. Part of the reactor-separator effluent is returned to the inlet of the circulating pump 7 where it is combined with fresh paste. The remainder of the effluent of the reactor-separator is metered to a second reactor 12, the first in a series of polycondensation reactors, wherein esterification is substantially completed (in excess of 95% esterification).

Overheads from both the reactor-separator 8 and the second, polycondensation reactor 12 are found to contain less than about 0.2% oligomers, calculated on the weight of terephthalic acid fed, in the distilled vapors of the condensers 13 and 14, respectively. The product emanating from the second reactor 12 is then continuously fed into a third reactor 15. The third reactor effluent is perfectly white, and no problem is encountered due to oligomers distilling out of the reaction mixture. The product of the reactor 15 is further processed through two additional reactors, a fourth reactor 16 and thence in divided flow through the reactors five, labeled as 17 and 18, respectively. In these final two reactors, fourth reactor 16 (for example, a cartwheel reactor) and fifth reactor 17 or 18, the intrinsic viscosity is increased first to a level suitable for the production of staple and finally to a level suitable for the production of tire cord. Again, as was the case with the third reactor and its associated condenser 19, no problem is encountered due to oligomers distilling out of the reaction mixture, in the vapors of the condensers 20 and 21, respectively.

In accordance with this invention, the ethylene glycol (EG) and the terephthalic acid (TPA) are advantageously admixed in a mol ratio of from about 1.1 to about 2.0 mols EG per mol TPA, and preferably in a mol ration EG/TPA of from about 1.3 to about 1.6. Surprisingly, it has been found that by combining the paste mixture with recirculating or recycle partially esterified product, in an amount ranging from between about 3 to about 100 parts recycle, and more preferably from between about 40 to about 80 parts recycle, for every one part paste, the reaction starts essentially immediately since the terephthalic acid dissolves essentially instantly in the recirculating mixture, whereas, when slurries are reacted, the undissolved terephthalic acid (at the center of solid particles of the same) can not enter into the reaction. It will thus be appreciated that a particularly desirable feature of this invention is that it enables one to employ terephthalic acid of no particular particle size other than that readily commercially available from a variety of sources. The reason that the rate of dissolution of the terephthalic acid and consequently the rate of reaction are not significant parameters according to the invstant process is because dissolution of the TPA at the point of admixture with the recycle is markedly enhanced due to an abundance of available hydroxyl groups with which the TPA can react at such point. These hydroxyl groups are available both from the ethylene glycol present in the paste and recycle, as well as from the mono- and bis-hydroxyethyl terephthalates also present in said recycle.

Another especially desirable feature of this invention is that the reaction is substantially insensitive to short term fluctuations in the EG/TPA mol ratio, since the glycol feed is combined almost instantly with the carboxyl groups, and the excess is evaporated with the water of reaction.

Furthermore, admixture of a paste with the recirculating mixture (believed to be aided by the pressure in the system) functions to impart a temperature to the reacting mass at the point of admixture, labeled as point A on the figure of drawing, which is characteristically lower than the temperatrue of the recirculating mixture withdrawn from the reactor-separator. This temperature change affords the added advantage of assisting in halting the evolution of glycol. The paste itself is supplied at a temperature higher than that which would stop the reaction but lower than that which would cause plugging in the system. It has also been found that the time required for the reacting mass to pass from the point A through the heater and thence through the reactor-separator to the point B (whereat the temperature of the reacting mass again attains the temperature conditions existing in the reactor separator) substantially corresponds to the reaction time for attaining a degree of esterification at the point B which substantially corresponds to that which would have existed in the recirculating mixture at the point A had not the paste been there added to effectively reduce the degree of esterification of the entire mass a percentage point or two, or even more. Stated differently, and presupposing an insignificant variation in degree of esterification along the line B–A and a reduction in degree of esterification preferably to not lower than that existing at the clear point, a direct, graphically reproducible relationship exists between the difference in temperature or ΔT at the points A and B and the difference in percent esterification or ΔE at these same points. In a specific example of the above phenomenon according to the invention, and in conjunction with a heater maintained at about 260° C. and a reactor-separator maintained at about 270° C. and under 90 p.s.i.g. pressure, it was found that the addition of 40 parts recirculating mixture to a 1.5 EG/TPA paste (0.6–0.65 part TPA) resulted in a lowering of the temperature to a value of about 262° C. and a degree of esterification of about 78% at the point A, in contrast to the conditions of 270° C. and 80% esterification existing at the point B. An equally significant feature of the cooling parameter or ΔT according to the invention is that, in the absence of same, it was observed the system becomes severely plugged. Elimination of this plugging problem is therefore a prime attribute of the subject continuous process.

Another characteristic of the subject process is that it enables the use of an EG/TPA ratio that is as close to unity as is practicable. This of course avoids glycol wastes and shifts the economics of the process more to the favorable side.

The reaction of the TPA with the EG according to the invention is so fast that the product leaving the reactor-separator contains enough bound glycol to enable same to be further condensed to a high viscosity, for example, an intrinsic viscosity of about 1.0, with an incidence of carboxyl end groups of less than 15 and a substantial absence of any free glycol in this effluent product. It has also been found that charging a suitable polycondensation catalyst with the raw materials for esterification causes simultaneous polycondensation to occur with the esterification. This reduces the amount of volatile mono- and bis-hydroxyethyl terephthalates, thereby increasing yield and enabling higher temperatures and lower pressures to be used in the third and subsequent reactors, the polycondensation reactors, with no problem of blocking of vapor lines due to distillation of oligomers. For example, it is possible according to the invention to operate the third reactor or reactor 3 at a temperature of 275° C. and a pressure ranging from between about 25 and 75 mm. Hg to afford a polymer having an intrinsic viscosity ranging from between 0.2 and 0.4. The fourth reactor, for example, a cartwheel reactor, can be maintained at a temperature between about 280° C. and 285° C. and a pressure of about 1.5 mm. Hg to provide polymer of 0.6–0.65 intrinsic viscosity (staple grade). The reactors five can each be maintained at a temperature of about 285° C. and a pressure of about 0.2 mm. Hg to provide polymer of tire yarn grade, namely, polymer having an intrinsic viscosity of at least 0.90 and preferably from 0.95 to 1.0 and even higher up to about 1.20. The product stream from the illustrated second reactor to the third reactor, furthermore, is essentially a plug flow which yields a high and uniform degree of polymerization (of from 6 to 8) in the reactor 3 feed since short-circulating does not occur. Less than 0.2% oligomers are found in the overheads from the reactor-separator and reactor 2. Moreover, the overheads from the reactor-separator are found, in this instance, to contain ethylene glycol and water in the approximate ratio 3/7, whereas those from the reactor 2 contain ethylene glycol and water in the approximate ratio 1/1. Effluent from the reactor-separator is comprised of about 3% free ethylene glycol when same is maintained at about 90 p.s.i.g. pressure, and about 5% free ethylene glycol when maintained at about 110 p.s.i.g. pressure.

The direct esterification of the polycarboxylic acid and the polyol may start in the heat exchange at a temperature as low as about 200° C. and range up to about 300° C. at atmospheric and superatmospheric pressures ranging up to about 500 p.s.i.g. However, more preferably the mixture is initially heated to a temperature of about 230° C. to about 270° C. and at a pressure, when superatmospheric pressure is employed, ranging from about 50 to about 250 p.s.i.g. The actual reaction times will vary depending upon the reaction temperature and pressure.

The condensation or polymerization of the glycol polycarboxylic acid ester is then carried out at temperatures ranging from about 260° C. to about 300° C. in one or more reactors and under reduced pressures which can be as low as 0.1 torr. The condensation or polymerization is carried out under these conditions for periods of from about 2 to about 10 hours and preferably from about 2 to about 6 hours until a polymerization product of the requisite molecular weight, as determined by viscosity or other convenient physical measurement, is obtained. The duration of the condensation depends upon the predetermined polymerization conditions, such as, batch or continuous process, temperature and pressure profiles, catalyst concentration, surface generation conditions, etc. The polymerization mass, in a continuous polymerization process, can be agitated continuously to give maximum exposure to the vacuum which assists in removing any unreacted glycol.

Various additives may be added with the polycarboxylic acid polyol feed or during the direct esterification reaction in order to further control the reactions or characteristics of the final polymer as required for specific end uses. For example, if fatigue resistance is desirable, an amount of diphenylene phenylene diamine can be added. Other well known additives can be used to control such characteristics of the finished polymer as heat and light stability, dye uptake, adhesion, static dissipation, luster, flammability and the like. Other frequently used additives are dyestuff precursors and assistants, non-reactive and heterogeneous polymers, pigments, fluorescent agents, brighteners and the like. Reaction control additives such as esterification of polycondensation catalysts, ether inhibitors, chain terminators, etc. can also be added with the polycarboxylic acid-polyol feed or during the direct esterification.

The esterification catalysts may be added in small catalytic amounts, e.g., 0.001 to 1% by weight based upon the feed. Representative examples of such catalysts are para-toluene sulfonic acid, zinc salts such as zinc chloride, tin oxide, tin tetrachloride, tin octoate and various of the amines. Likewise with respect to the polycondensation catalysts which include the compounds of antimony as antimony oxide, lead oxide, sodium alcoholate, lithium hydride, zinc acetate and zinc acetylacetonate. Suitable ether inhibitors (especially of diethylene glycol), which are preferably added in amounts of from 0.01 to 0.30% by weight glycol, comprise sodium, sodium methoxide, sodium acetate, sodium terephthalate, manganous acetate and calcium acetate.

In preparing the linear, high molecular weight polyester contemplated by the invention, the process can be advantageously operated as a continuous process by continuously feeding a mixture of polycarboxylic acid and polyol into about 3 to about 100 parts, preferably into about 40 to about 80 parts, of recirculating polycarboxylic acid ester-polycarboxylic acid-polyol water mixture and feeding the resultant admixture into a heater to provide a continuous flowable uniform dispersion of said admixture and then introducing the admixture into a polymerizing apparatus and further esterifying and condensing the admixture until the desired molecular weight is obtained. The type of reaction admixture required for maintaining a continuous dispersion feed to the heater is obtained by introducing one part of the polycarboxylic acid and polyol paste mixture to from about 3 to about 100 parts, preferably to from about 40 to about 80 parts, or more of the recirculating polycarboxylic acid esterpolycarboxylic acid-polyol water mixture wherein said polycarboxylic acid is from about 30 to about 85% esterified and wherein the temperature of said admixture is maintained between about 230° C. to about 270° C. and the pressure is maintained between about 50 and about 250 p.s.i.g. The polycarboxylic acid attains a degree of esterification of from at least about 30 in the heater, and up to as much as 85% and even higher in the reactor-separator from whence the recirculating mixture is withdrawn.

Figure 2:
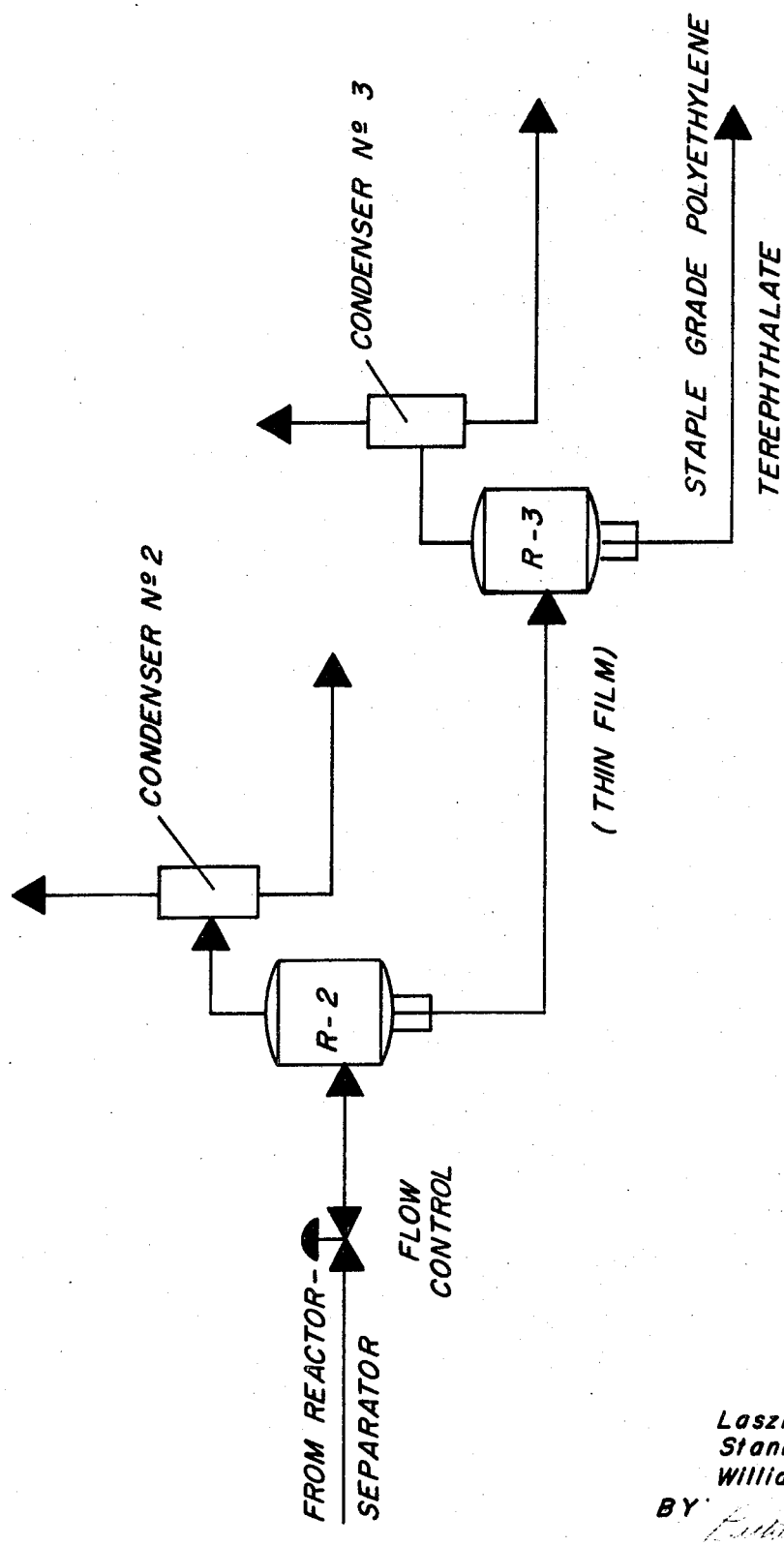
FIG. 2 is a diagrammatical drawing of another and alternative apparatus useful in carrying out the method of this invention, downstream of the reactor-separator of FIG. 1.
Figure 3:
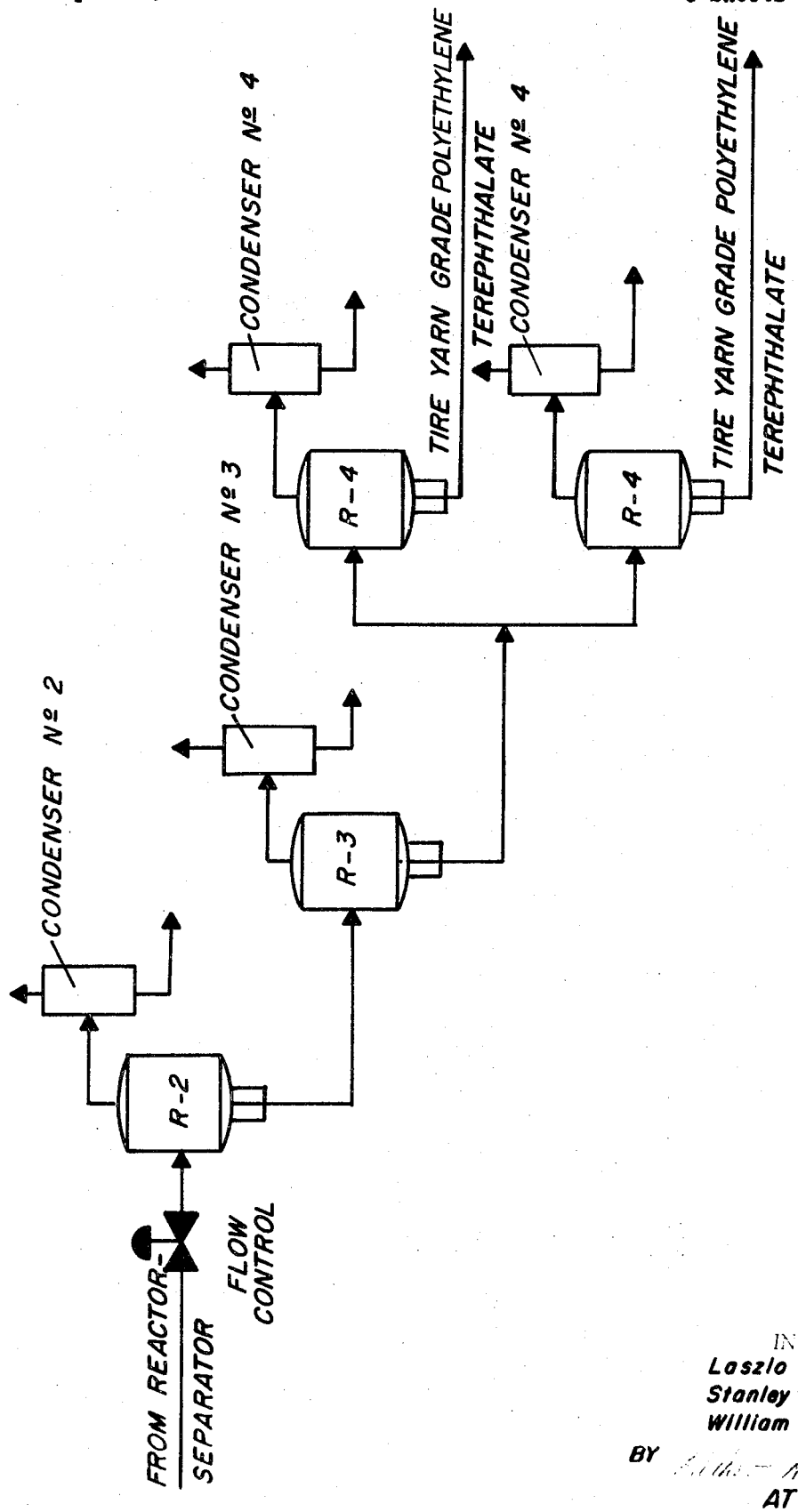
FIG. 3 is a diagrammatic drawing of yet another and alternative apparatus useful in carrying out the method of this invention, again downstream of the reactor-separator of FIG. 1.

By the method of this invention, and perhaps most importantly, an aid to the ultimate finishing of the polymer is also provided because the products exiting the reactor 2 and subsequent reactors (conventionally up to a total of five reactors, as illustrated in FIG. 1, including the reactor-separator) display intrinsic viscosities which are correspondingly higher than those obtainable from the respective reactors employed not in conjunction with this invention. Alternatively, it is even possible according to the invention to eliminate altogether one or more of such reactors while at the same time still being able to provide polymer suitable for the production of staple, filament and tire cord. This latter has the advantage of requiring less residence time in a finisher with concomitant less degradation of polymer due to the fact that exposure to polymer degradative conditions as elevated temperatures is diminished. As exemplary of the aforesaid alternatives which eliminate a part of the apparatus requirement heretofore considered necessary in the art, in one instance the effluent of reactor 2 is pumped to a reactor or finisher of thin film type (in which the reaction mixture is distributed in thin layers) maintained at 285° C. and 1.5 mm. Hg pressure directly wherefrom there is obtainable polymer of an intrinsic viscosity in the order of 1.55 and melting point of 255° C. (see FIG. 2). In another such instance, the effluent of reactor 2 is pumped into a third reactor maintained at 280° C. and 1.5 mm. Hg pressure and the effluent of said reactor 3 then pumped in divided flow to each of a pair of fourth and final reactors maintained at 290° C. and 0.5 mm. Hg pressure to produce a superpolyester having an intrinsic viscosity of 0.95 and a melting point of 256° C. (see FIG. 3).

PREFERRED EMBODIMENTS

The following examples illustrate first the problem encountered and then the practice and principles of this invention illustrating how the problem was solved, but it should be understood that these are given by way of illustration and not of limitation and that many changes in the details can be made without departing from the spirit of the invention.

Example 1

Forty-one and one-half pounds per hour of terephthalic acid and 24.8 pounds per hour of ethylene glycol in a glycol to acid mole ratio of 1.6 are mixed in a paddle mixer and pumped into a pipe reactor heated with Dowtherm at 270° C. The pressure gauge on the feed pipe indicated increasing pressure until after about two minutes the pressure increased to 350 p.s.i.g. and the pump motor automatically shut off. After several minutes the pressure decreased and the feed was again started. Once again the pressure increased to such an extent that the pump motor automatically shut off. After several starts and stops, the pipe was dismantled and inspected. Solid hard paste formation was found in one third of the preheater pipe section indicating that during heat-up, at a certain temperature range the paste changes in physical properties wherein it passes from a viscous state into a solid state. Thus this system of operation was abandoned.

Example 2

Using the apparatus of FIG. 1 of the drawing, forty one and one-half pounds per hour (0.25 lb. moles/hr.) of purified terephthalic acid and 23 pounds of ethylene glycol per hour (0.37 lb. moles/hr.) and 0.88 pound per hour of diisopropylamine were continuously fed to the paddle mixer where they were converted to a paste. The paste mixture was then pumped from the mixer by the feed pump to the inlet of the circulating pump. The paste mixture was pumped with 40 parts of recirculating mixture by the circulating pump through the multiple tube and shell heat exchanger where it was heated to 260° C. After leaving the heat exchanger, the mixture entered a reactor-separator which was maintained at 260° C. by conventional Dowtherm heating means, and 90 p.s.i.g. pressure by means of an automatic vent valve. The terephthalate ester, terephthalic acid, glycol-water mixture leaving this reactor was split, with part returned to the inlet of the circulating pump where it was combined with fresh paste and part flowed to the first in a series of reactors where polycondensation took place by conventional means. The pressure differential between the esterification reactor and the first polycondensation reactor caused the material to flow toward the polycondensation reactor, but a level control actuated a valve which prevented all of the effluent from taking that route in preference to the route returning to the inlet of the circulating pump. Therefore, approximately 2,560 pounds per hour of partially esterified material were returned to the circulating pump.

The final polymer (after two steps of polycondensation) was extruded through a 1 hole die plate into a quenching water trough and into a pelletizer. The properties of the final polymer after drying were found to be as follows: Intrinsic viscosity in 60% phenol-4% tetrachloroethane mixture=0.67, carboxyl end groups=16 equivalents per $10^6$ grams, and the melting point=256 C. as determined on a Differential Thermal Analyzer, using a heating rate of 4° C./minute. Analysis of samples showed that the effluent of the first reactor was 96.5% esterified. The system operated without plugging of the heat exchanger.

Example 3

Fifty-four pounds per hour of a mixture of 90:10 of 2, 6:2, 7 naphthalene dicarboxylic acid and 23 pounds of ethylene glycol per hour were continuously fed to a paddle mixer where they were converted to a paste. The process was then carried out in the same apparatus and in the same manner as in Example 2 except:

(a) The heater and esterification reactor were operated at 270° C. and the same percentage of the effluent was recirculated from the first reactor by the circulating pump and (b) The polymerization reactors were operated at temperatures progressively rising from 285° C. to 295° C. The properties of the final polymer after drying were found to be as follows: Intrinsic viscosity=0.82, carboxyl end groups=11 equivalents per $10^6$ grams, and the melting point=255° C. as determined on a Differential Thermal Analyzer, using a heating rate of 4° C./minute. Analysis of samples shows that the aromatic acid in the effluent of the first reactor was 74% esterified. The system operated for 30 hours before stopping this test without the plugging of the heat exchanger.

Example 4

Again using the apparatus of FIG. 1 of the drawing, forty one and one-half pounds per hour of coarse grained terephthalic acid and 23 pounds of ethylene glycol per hour (E.G./TPA 1.5/1.0) and polycondensation catalyst supplying 0.0248 pound per hour of antimony (600 p.p.m.) and 0.1245 pound per hour of diisopropyl amine (0.3%) were continuously fed to the paddle mixer where they were converted to a paste. The paste was then pumped from the mixer by the feed pump to the inlet of the circulating pump. The paste mixture (one part) was pumped with 80 parts of recirculating mixture by the circulating pump through the heater as in Example 2. The heater was maintained at 275° C. and the reactor-separator was maintained at 275° C. and atmospheric pressure. Part of the separator effluent was returned to the inlet of the circulating pump where it was combined with fresh paste. The rest of the separator effluent was metered to another reactor maintained at 275° C. and atmospheric pressure in which the esterification was substantially completed (>95% esterified). Less than 0.2% of the TPA feed was found in distilled vapors as oligomers. The esterified product of this second reactor had an intrinsic viscosity of 0.09, degree of polymerization about 6 and melting point of 240–245° C. The distilled vapors were again found to contain less than 0.2% oligomers. This product was continuously fed into a third reactor maintained at a temperature of 275° C. and a pressure of 50 mm. Hg. The third reactor effluent was perfectly white and had an intrinsic viscosity about 0.24, degree of polymerization about 25 and melting point of 256° C. No problem was encountered due to oligomers distilling out of the reaction mixture. The product of the third reactor was further processed through two additional reactors in which the intrinsic viscosity was increased first to 0.62 and finall to 1.00. These final two reactors operated at about 2.0 and 0.5 mm. Hg pressure and 285 to 295° C., respectively. Residence times in the reactors of this process were as follows:

| Reactor: | Time (hours) |
|---|---|
| 1 | ½ |
| 2 | 1 |
| 3 | 1 |
| 4 | 2 |
| 5 | 2 |
| Total | 6.5 |

Example 5

Forty one and one-half pounds per hour of fine grained terephthalic acid and 20.46 pounds per hour of ethylene glycol (EG/TPA 1.4/1.0) and polycondensation catalyst, 0.332 pound per hour, supplying 800 p.p.m. of antimony and 0.1245 pound per hour of diammonium terephthalate were fed into the equipment described in Example 4. The paste was combined with recirculating mixture from the reactor-separator in the ratio of 1 part to 40 parts. A sample indicated that a clear solution was produced within 15 seconds of the time that the paste was combined with the recirculating mixture. The fine particle size of the terephthalic acid appeared to have no effect on the reaction as compared with previous examples. The heater and reactor-separator were maintained at 265° C. at a pressure of 90 p.s.i.g. Part of the effluent from the first reactor was recirculated and part was metered into the second reactor which was maintained at 275° C. and atmospheric pressure. Overheads from the second reactor contained less than 0.2% oligomers calculated on the weight of terephthalic acid fed. Effluent of reactor 2 had an intrinsic viscosity of 0.10, degree of polymerization about 8, and melting point of 240° C. It was pumped into a third reactor maintained at 280° C. and 2.5 mm. Hg pressure where it was converted to polymer having an intrinsic viscosity of 0.45 with melting point of 256° C. A fourth reactor maintained at 290° C. and approximately 0.2 mm. Hg pressure converted the polymer into a superpolyester having intrinsic viscosity of 0.95 and melting point of 256° C. Thus only 4 reactors were needed in contrast to Example 4 in which 5 reactors were used. Total residence time in the 4 reactors was 4.5 hours. This example illustrates the use of the apparatus of FIG. 3 of the drawing.

Example 6

The procedure of Example 4 was duplicated except that the product of the second reactor was fed to a thin film reactor maintained at 285° C. and 1.5 mm. Hg pressure. The product of this reactor had an intrinsic viscosity of 0.55 and melting point of 255° C. and was suitable for the production of staple fiber. It is to be noted that only 3 reactors with a total residence time of 3½ hours were needed to produce polymer suitable for conversion to useful textile fiber. This example illustrates the use of the apparatus of FIG. 2 of the drawing.

The invention has been illustrated particularly with respect to the use of terephthalic acid and naphthalene dicarboxylic acid and ethylene glycol as reactants. It can also be used to prepare polyesters from other acids and other glycols. For example, instead of terephthalic acid and naphthalene dicarboxylic acids such aromatic dicarboxylic acids as phthalic acid, isophthalic acid, phthalic anhydride, and p,p'-diphenyl dicarboxylic acids; cycloaliphatic dicarboxylic acids such as hexahydroterephthalic acid and aliphatic dicarboxylic acids such as succinic acid, adipic acid, sebacic acid, etc., can be used as well as substituted acids such as 5-sulfo-isophthalic acid, etc. Polyesters of glycols other than the most preferred ethylene glycol can also be similarly processed. Such glycols are the linear and alicyclic alkylene glycols having 2 to about 10 carbon atoms per molecule. The more preferred glycols, however, are the low molecular weight glycols which contain 2 to about 4 carbon atoms per molecule since they produce highly polymerized esters having high melting points. Such glycols include propylene glycol, butylene glycol, trimethylene glycol, tetramethylene glycol, decamethylene glycol, 1,4-cyclohexane dimethanol, 1,3-cyclobutane dimethanol and mixtures thereof. This invention can also be used to prepare copolyesters by reacting one or more acids with one or more of the glycols.

Many advantages are obtained through the use of this process. The free acids utilized in a direct esterification process are more reasonable in cost as compared to the dialkyl esters previously used in the ester-interchange process of the prior art and plant equipment costs are also reduced by utilizing the process of this invention. Furthermore, by maintaining a flowable precursor dispersion for continuously maintaining the reaction, continuous processing is made possible with its consequent economies. Still further, reaction rates are rapid, and substantially complete esterification reaction is carried out in a minimum of time, and higher intrinsic viscosities are obtained than heretofore. Further advantages are obtained by being able to use lower glycol-acid ratios as well as less expensive equipment. Other advantages in addition include the ease of use of catalysts and other additives where necessary or desired both in the direct esterification step or in the condensation or polymerization step of this process. That is, this new and improved process enables the use of any additive quite simply thereby enabling one skilled in the art to prepare substantially any polymer required or desired.

From the foregoing discussion, description and data, it is easily observed that the present invention provides a significant contribution in the art of preparing high molecular weight polyesters and copolyesters suitable for use in the preparations of fibers, filaments and films. While the invention has been described with regard to specific detail, it will be appreciated that changes can be made without departing from its scope.

What is claimed is:
1. In the preparation of high molecular weight linear condensation polyester from a polycarboxylic acid selected from the group consisting of terephthalic acid, isophthalic acid, naphthalene dicarboxylic acid, and hydrogenated derivatives thereof and ethylene glycol, the improvement which comprises (a) esterifying said polycarboxylic acid with said ethylene glycol by subjecting to conditions of direct esterification a flowable, uniform dispersion com- prised of (1) a paste of the said polycarboxylic acid and the said ethylene glycol and (2) about 40 to about 80 parts by weight per part paste of an about 74 to about 95% esterified product of said polycarboxylic acid with said ethylene glycol, and thence (b) further esterifying and polycondensing the esterification product of step (a) until there is obtained an improved polyester of the desired molecular weight.

2. The method of defined by claim 1, wherein the partially esterified product (2) is continuously recycled to the esterification zone, the paste (1) is continuously admixed therewith at a predetermined point in the recycle system, and the step (b) is conducted continuously.

3. The method as defined by claim 1, wherein the temperature of esterification is maintained between about 200° C. and about 300° C. and the pressure is maintained between about atmospheric and about 500 p.s.i.g., and the temperature of step (b) is maintained between about 260° C. and about 300° C.

4. The method as defined by claim 1, wherein the molar ratio of the said ethylene glycol to the said polycarboxylic acid is 1.1:2.0.

5. The method as defined by claim 4, wherein the molar ratio is 1.3:1.6.

6. The method as defined by claim 1, wherein a member selected from the group consisting of an esterification catalyst, a polycondensation catalyst, an ether inhibitor and mixtures thereof is added to the reaction mixture either prior to, during or subsequent to the addition of the partially esterified product.

7. The method as defined by claim 1, wherein, in the second stage of polycondensation in the step (b), the reaction mixture is distributed in thin layers.

8. The method as defined by claim 1, wherein the esterification product of step (a) is processed through three stages of polycondensation in the step (b) until there is obtained an improved polyethylene terephthalate having an intrinsic viscosity suitable for the production of tire yarn.

References Cited
UNITED STATES PATENTS

| | | | |
|---|---|---|---|
| 3,496,146 | 2/1970 | Mellichamp | 260—475 |
| 3,497,473 | 2/1970 | Kemkes | 260—475 |
| 3,506,662 | 4/1970 | Higgins | 260—475 |

FOREIGN PATENTS

| | | | |
|---|---|---|---|
| 39/23,564 | 10/1964 | Japan | 260—475 |
| 1,013,034 | 12/1965 | Great Britain | 260—475 |
| 1,136,455 | 12/1968 | Great Britain | 260—475 |

LORRAINE A. WEINBERGER, Primary Examiner

E. J. SKELLY, Assistant Examiner

U.S. Cl. X.R.

23—260; 260—468 R, 470, 475 P, 485 G

UNITED STATES PATENT OFFICE
CERTIFICATE OF CORRECTION

Patent No. 3,689,461      Dated September 5, 1972

Inventor(s) L. J. Balint et al.

It is certified that error appears in the above-identified patent and that said Letters Patent are hereby corrected as shown below:

Column 6, line 4, "exchange" should be --exchanger--.

Column 6, line 44, "of" should be --or--.

Column 8, line 36, "4%" should be --40%--.

Column 9, line 27, "finall" should be --finally--.

Column 11, line 9, "of" should be --as--.

Signed and sealed this 26th day of February 1974.

(SEAL)
Attest:

EDWARD M. FLETCHER, JR.
Attesting Officer

C. MARSHALL DANN
Commissioner of Patents